(12) United States Patent
Le Quéré

(10) Patent No.: US 8,891,757 B2
(45) Date of Patent: Nov. 18, 2014

(54) PROGRAMMABLE CRYPTOGRAPHIC INTEGRATED CIRCUIT

(75) Inventor: Patrick Le Quéré, Villebon sur Yvette (FR)

(73) Assignee: Bull SAS, Les Clayes-sous-Bois (FR)

( * ) Notice: Subject to any disclaimer, the term of this patent is extended or adjusted under 35 U.S.C. 154(b) by 0 days.

(21) Appl. No.: 13/399,348

(22) Filed: Feb. 17, 2012

(65) Prior Publication Data

US 2012/0213360 A1    Aug. 23, 2012

(30) Foreign Application Priority Data

Feb. 18, 2011    (FR) ...................................... 11 51332

(51) Int. Cl.
*H04K 1/00* (2006.01)
*G06F 9/38* (2006.01)
*G06F 15/78* (2006.01)
*G06F 21/72* (2013.01)

(52) U.S. Cl.
CPC .......... *G06F 15/7842* (2013.01); *G06F 9/3895* (2013.01); *G06F 9/3877* (2013.01); *G06F 21/72* (2013.01); *G06F 9/3879* (2013.01)
USPC ................... 380/28; 380/27; 712/34; 712/43; 712/225; 712/227

(58) Field of Classification Search
CPC ........................... G06F 9/3877; H04L 63/0435
USPC .......................................................... 380/28
See application file for complete search history.

(56) References Cited

U.S. PATENT DOCUMENTS

| | | | |
|---|---|---|---|
| 5,883,905 A * | 3/1999 | Eastburn ....................... | 714/738 |
| 2003/0084309 A1* | 5/2003 | Kohn ............................ | 713/189 |
| 2004/0030907 A1 | 2/2004 | Dariel | |
| 2004/0225885 A1 | 11/2004 | Grohoski et al. | |

FOREIGN PATENT DOCUMENTS

| | | |
|---|---|---|
| EP | 0 601 907 A2 | 6/1994 |
| WO | WO 99/39475 | 8/1999 |

OTHER PUBLICATIONS

Google Patents search results.*
Google Scholar search results.*
Google web search results.*
Wang et al., "A Unified Architecture for a Public Key Cryptographic Coprocessor", Journal of Systems Architecture, No. 54, 2008, pp. 1004-1016.
Greathouse, "Processors with On-Die Cryptography Accelerators", Apr. 13, 2007, XP-002661040, pp. 1-13.

* cited by examiner

*Primary Examiner* — Arvin Eskandarnia
(74) *Attorney, Agent, or Firm* — Miles & Stockbridge P.C.

(57) ABSTRACT

A cryptographic integrated circuit including a programmable main processor for executing cryptographic functions, an internal memory, and a data transmission bus to which the main processor and the internal memory are electrically connected. The cryptographic integrated circuit also includes a programmable arithmetic coprocessor that has specific hardware arithmetic units each being designed to carry out a predetermined arithmetical operation. The programmable arithmetic coprocessor is separate from the main processor and is also electrically connected to the data transmission bus.

8 Claims, 2 Drawing Sheets

PROGRAMMABLE CRYPTOGRAPHIC INTEGRATED CIRCUIT

FIELD OF THE INVENTION

This invention relates to a cryptographic integrated circuit. More specifically, it focuses on an integrated circuit comprising a programmable main processor for executing cryptographic functions, an internal memory, and a data transmission bus to which the main processor and the internal memory are electrically connected.

It particularly applies to the secure generation or transmission of data using hardware security modules (HSMs) or virtual private networks (VPNs) secured by encryption. In these fields, integrated circuits with embedded asymmetric cryptographic functions based on modular arithmetic calculations are commonly used.

BACKGROUND OF THE INVENTION

The most well-known cryptographic functions include, for example:
- the Rivest Shamir Adleman (RSA) algorithm, based on a modular exponentiation operation,
- the Elliptic Curve Cryptography (ECC) family of algorithms, based on the principle of the elliptic curve discrete logarithm, which implements a scalar multiplication operation, this operation using the main modular arithmetic operations of addition, subtraction, multiplication, and inversion,
- the Diffie-Helmann algorithm, based on the principle of the discrete logarithm on integers, implementing the modular exponentiation operation,
- the Rabin-Miller probabilistic primality algorithm, based on the modular exponentiation operation.

They are implemented by security protocols, such as the Secure Sockets Layer (SSL) or Internet Key Exchange (IKE) protocol.

The three major characteristics that a cryptographic integrated circuit should optimize are:
- its ability to support a large number of protocols and thus cryptographic algorithms, which forces it to implement the main standard functions of the modular arithmetic, including addition, subtraction, multiplication, division, reduction, inversion, exponentiation, and scalar multiplication,
- its performance in terms of the number of protocol operations it can carry out per second, such as the number of SSL transactions per second or even the number of IKE key exchanges per second, these performances being directly related to the number of underlying arithmetical operations it can execute per second,
- its resistance to various attacks designed to retrieve secret data used during the execution of a cryptographic algorithm, such as simple power analysis (SPA) or differential power analysis (DPA) attacks, which measure the currents and voltages going in and out of the integrated circuit.

Regarding this third characteristic to be optimized, the circuit preferably integrates a specific implementation of cryptographic algorithms, generally described as countermeasure implementation, which is implemented at the expense of performance.

A first solution for at least partly optimizing these characteristics involves designing integrated circuits with specialized hardware, called application-specific integrated circuits (ASICs). These circuits are custom designed. They have the advantage of a reduced product cost, full control of implemented functions, and high performance because the functions they support are wired into the circuit. However, this results in a long and costly development that can be recovered only in a market that is capable of absorbing large quantities of integrated circuit products, such as the U.S. market.

By contrast, in Europe, because there is less volume produced and fewer means of investment, a second solution is adopted, based on a technology of programmable integrated circuits, such as field-programmable gate array (FPGA) technology, which implements a programmable main processor with an internal memory. This second solution associates the programmable main processor of the FPGA circuit to specific integrated circuits and redirects some cryptographic functions that are normally performed by the main processor, such as modular multiplication, exponentiation, or even scalar multiplication, to these integrated circuits that are physically dedicated to such functions. These dedicated circuits are called hardware accelerators. Although this solution can increase the performance of the FPGA circuit, the hardware accelerators must be replaced when it is needed to perform a counter-measure. Also, place and route of the integrated circuit becomes necessary whenever there is a change to the microcode executed by the main processor. "Place and route" means the process during which the various parts of an integrated circuit are automatically positioned and connected.

Using FPGA technology, it would also be impossible to have a pure software solution that involves programming the main processor because the processors in FPGA circuits are usually 32-bit processors that operate at frequencies below 200 MHz, making such a solution especially slow. Moreover, although possible in theory, running multiple processors in parallel in a single FPGA circuit would quickly become limited due to insufficient internal memory. It would then be necessary to use external random access memory (RAM).

It may therefore be desirable to provide a cryptographic integrated circuit that can overcome at least some of the above mentioned problems and constraints.

SUMMARY OF THE INVENTION

The invention therefore relates to a cryptographic integrated circuit comprising a programmable main processor for executing cryptographic functions, an internal memory, and a data transmission bus to which the main processor and the internal memory are electrically connected, characterized in that it further comprises, also electrically connected to the data transmission bus and being separate from the main processor, a programmable arithmetic coprocessor comprising specific hardware arithmetic units, each of these specific hardware arithmetic units being designed to carry out a predetermined arithmetical operation.

Therefore, the arithmetical operations behind all of the cryptographic functions implemented by the main processor of the programmable integrated circuit are accelerated due to the presence of these hardware arithmetic units, and some of the programmable calculations involving these arithmetical operations can be redirected from the main processor to the arithmetic coprocessor, which is also programmable. It is then possible to actually offload the main processor of the integrated circuit while also increasing the speed of calculations and allowing implementation flexibility. Specifically, it becomes possible to customize the implementation of each cryptographic algorithm to prevent SPA, DPA, or other attacks without requiring a place and route of the integrated circuit with each implementation change. Finally, there is less load on the internal memory of the integrated circuit, and it is no longer necessary to provide external RAM.

Optionally, the hardware architecture of each specific hardware arithmetic unit in the arithmetic coprocessor is designed to carry out operations on numbers that are binary-coded in words of at least 128 bits, called "large numbers".

Also optionally, the programmable arithmetic coprocessor comprises at least one hardware arithmetic unit for modular addition, one hardware arithmetic unit for modular multiplication using Montgomery reduction, and one hardware arithmetic unit for a modular logic operation.

Also optionally, the hardware architecture of at least one of the specific hardware arithmetic units, such as the hardware arithmetic unit for modular addition or the hardware arithmetic unit for modular multiplication using Montgomery reduction, is designed to carry out modular arithmetical operations in a pipeline mode and to return, on the one hand, several possible values from a requested single arithmetical operation and, on the other hand, a parameter for selecting a single value from said several possible values.

Increased speed is thereby possible, although at the cost of using more memory space.

Also optionally, the programmable arithmetic coprocessor comprises an output status register comprising a storage space of said selection parameter.

Also optionally, the programmable arithmetic coprocessor further comprises:
 a programmable sequencer that is electrically connected to each of the specific hardware arithmetic units and that integrates itself additional arithmetic units,
 an input/output interface that can be connected to the data transmission bus,
 a command scheduler that interfaces between the input/output interface and the programmable sequencer, and
 a local memory that is electrically connected to the programmable sequencer and to each of the specific hardware arithmetic units.

Also optionally, the hardware architecture of each additional arithmetic unit integrated into the programmable sequencer is designed to carry out operations on numbers that are binary-coded in words of at most 64 bits.

Also optionally, the programmable sequencer further comprises a controller for executing microprograms, a microcode memory, and multiple registers including an input command register that is writable by the command scheduler and an output status register that is readable by the command scheduler.

Also optionally, the microcode memory comprises program instructions for carrying out at least one of the operations from the set consisting of a modular multiplication, a modular exponentiation, a modular inverse calculation, a modular division, and an elliptic curve scalar multiplication, using the specific hardware arithmetic units and the additional arithmetic units.

Also optionally, the programmable main processor and the programmable arithmetic coprocessor are designed to communicate according to a programming interface providing at least a portion of a set of arithmetic calculation commands sent to the programmable arithmetic coprocessor by the main processor containing a field to indicate whether the modularity parameter for a modular arithmetical calculation is maintained from a previous calculation.

With this option, some calculations preceding some arithmetical operations that are dependent on this modularity parameter can be avoided when said parameter does not vary from one calculation to another.

BRIEF DESCRIPTION OF THE DRAWINGS

The invention will be better understood using the following description, given purely as an example and referring to the accompanying drawings, in which.

DETAILED DESCRIPTION

Figure 1:
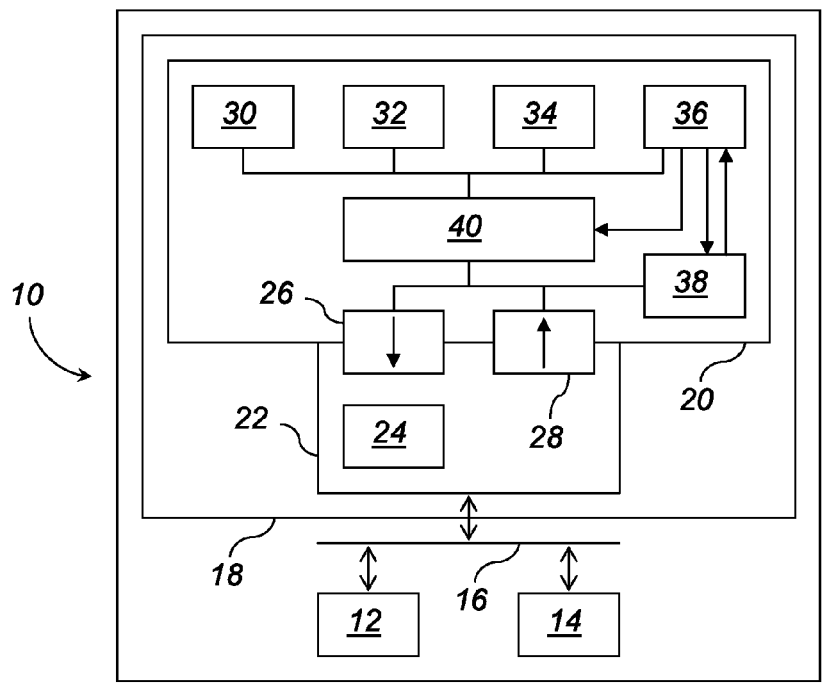
FIG. 1 schematically shows the general structure of a cryptographic integrated circuit according to an embodiment of the invention, FIG. 2 schematically details the structure of the sequencer of a programmable arithmetic coprocessor of the cryptographic integrated circuit in FIG. 1, and FIG. 3 details the structure of a set of local memory and hardware arithmetic units of the programmable arithmetic coprocessor of the cryptographic integrated circuit in FIG. 1.

The cryptographic integrated circuit 10 illustrated in FIG. 1 comprises a programmable main processor 12 for executing cryptographic functions, an internal memory 14, and a data transmission bus 16 to which the main processor 12 and the internal memory 14 are electrically connected.

It further comprises a programmable arithmetic coprocessor 18, which is separate from the main processor 12 and also electrically connected to the data transmission bus 16.

The main processor 12 and the programmable arithmetic coprocessor 18 exchange data by means of an application programming interface (API) consisting of commands and statuses implemented in the internal memory 14, which can be, for example, a shared memory, such as a dual ported random access memory (DPRAM). In order to offload the main processor 12, the commands it issues for the programmable coprocessor 18 are arithmetical macro-instructions to be applied to integer operands that are binary-coded in words of at least 128 bits, such as from 128 to 4096 bits. These operands are called "large numbers". There are two possible types of commands:
 commands for basic modular arithmetical operations (addition, subtraction, multiplication, etc.) that allow the main processor 12 to farm out basic operations while continuing to implement complex cryptographic operations, such as scalar multiplication or exponentiation, or
 commands for complex modular arithmetical operations (scalar multiplication, exponentiation, inversion, etc.) that fully offload these cryptographic functions from the main processor 12.

As such, the programmable arithmetic coprocessor 18 comprises a processing core 20 and an input/output interface 22 for connecting the processing core 20 to the bus 16. The interface 22 thus comprises a two-channel DMA controller 24 for simultaneously transferring data to and from memory that resides outside of the processing core, such as internal memory 14. It further comprises two first-in first-out (FIFO) buffer memories, one 26 for transmitting data from the processing core 20 to outside the programmable arithmetic processor 18 and the other 28 for transmitting data in the opposite direction.

The processing core 20 comprises multiple specific hardware arithmetic units 30, 32, and 34, designed to carry out predetermined arithmetical operations. Each of these is a wired integrated circuit whose hardware architecture is designed to always perform the same basic operation. For example, the hardware arithmetic unit 30 is a modular addition unit for large numbers that carries out modular addition/ subtraction on operands that are binary-coded in words ranging from 128 bits to 8192 bits. The hardware arithmetic unit 32 is a modular multiplication unit for large numbers that carries out modular multiplication using Montgomery reduction on operands that are binary-coded in words ranging from 128 bits to 4096 bits. Finally, the hardware arithmetic unit 34 is a modular logical operation unit for large numbers that carries out modular logical operations (shifts, comparisons, etc.) on operands that are binary-coded in words ranging from 128 bits to 4096 bits.

Note that it is possible for the modular addition unit 30 for large numbers to be capable of processing words that are twice as long as those processed by the modular multiplication unit 32 for large numbers because, when modular multiplications using Montgomery reduction are carried out on N bits, this implies necessarily the execution of some addition and subtraction operations on 2N bits.

The processing core 20 further comprises a programmable sequencer 36 that is electrically connected to each of the specific hardware arithmetic units 30, 32, 34 by wire-to-wire connections. It can itself include additional hardware arithmetic units, as it will be seen later with reference to FIG. 2, the hardware architecture of each additional arithmetic unit integrated into the programmable sequencer 36 being possibly designed to carry out operations on numbers that are binary-coded in words of up to 64 bits, in addition to the arithmetical operations carried out by the specific hardware arithmetic units 30, 32, and 34. The programmable sequencer 36 processes commands (or macro-instructions) issued by the main processor 12 and provides its results and statuses through a set of instructions, for instance programmed in assembly language and meant to be compiled. These are traditional instructions that will not be detailed. They can be modified and recompiled without having to place and route the main processor 12 in the integrated circuit 10.

The processing core 20 further comprises a command scheduler 38 that interfaces between the two buffer memories 26, 28 of the input/output interface 22 and the programmable sequencer 36. The command scheduler 38 accepts and synchronizes commands issued by the main processor 12. It also transmits the results and statuses provided by the programmable sequencer 36.

Finally, the processing core 20 comprises a local memory 40 that is electrically connected to the command scheduler 38, to the programmable sequencer 36, and to each of the specific hardware arithmetic units 30, 32, and 34. This local memory 40, which can be in the form of RAM, stores "large numbers" operands organized in variables and parameters. The number of variables that can be stored in this local memory 40 depends of course on the size of the memory and the variables. As will be detailed later with reference to FIG. 3, a local memory 40 that can store, for example, two 4096-bit variables or twenty-two 521-bit variables may be sufficient. The operand parameters can be the modulo, elliptic curve or scalar multiplication parameters, an exponentiation coefficient, modular multiplication parameters using Montgomery reduction, etc.

Commands received by the programmable arithmetic coprocessor 18 as macro-instructions and implemented in the form of microprograms in the programmable sequencer 36 using the aforementioned set of instructions, may include the following:

the modulo-p addition of two integers A and B, C=A+B mod p, where A, B, and p are integers with 128 to 4096 bits, the modulo-p subtraction of two integers A and B, C=A−B mod p, where A, B, and p are integers with 128 to 4096 bits, the modulo-p multiplication of two integers A and B, C=A×B mod p, where A, B, and p are integers with 128 to 4096 bits, the modulo-p exponentiation of an integer A by an integer B, $C=A^B$ mod p, where A, B, and p are integers with 128 to 4096 bits, the modulo-p scalar multiplication of a vector A(x,y) by a scalar k, C=k·A mod p, where x, y, k, and p are integers with 128 to 521 bits, the modulo-p reduction of an integer A, C=A mod p, where A is an integer with 128 to 8192 bits and p is an integer with 128 to 4096 bits, the modulo-p inversion of an integer A, C=1/A mod p, where A and p are integers with 128 to 1024 bits, and the modulo-p division of two integers A and B, C=A/B mod p, where A, B, and p are integers with 128 to 1024 bits.

The input/output interface 22 of the programmable arithmetic coprocessor 18 then executes the following tasks:

wait for a command signal activation from an external processor, in this case the main processor 12, go and search for a command in a memory that is external to the coprocessor 18, such as the internal memory 14 of the circuit 10, using the DMA controller 24 in order to place it in the buffer memory 28, go and search for the operand(s) and modulo parameter p for a given command, in the internal memory 14 of the circuit 10, using the DMA controller 24 in order to place them in the buffer memory 28, wait for the buffer memory 26 to contain a requested result in order to place it into the internal memory 14 of the circuit 10, and generate a command acknowledgement signal for the main processor 12.

The command scheduler 38 of the programmable arithmetic coprocessor 18 executes the following tasks:

read a command in the buffer memory 28 and send it to the programmable sequencer 36 by matching the address of a corresponding microprogram to each macro-instruction of the given command, read the operand(s) and modulo parameter p of a given command in the buffer memory 28 and write them to the local memory 40, launch an execution of the programmable sequencer 36 to process a command and wait for that processing to end, and transfer the result of processing from the local memory 40 to the buffer memory 26.

Figure 2:
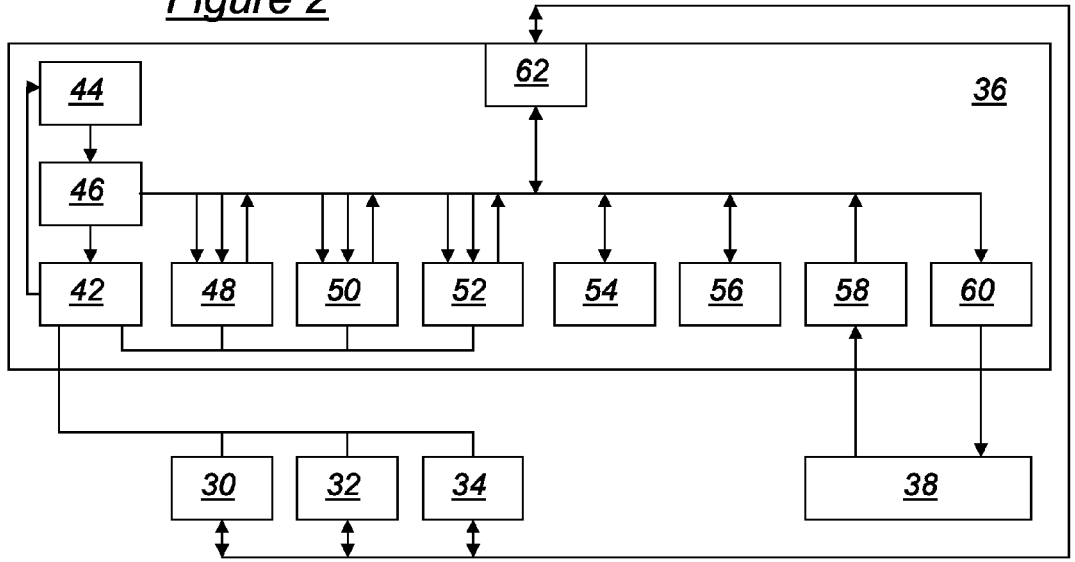

The operation of the programmable sequencer 36 will now be detailed based on a description of its constituent elements that are illustrated schematically in FIG. 2.

It first comprises a controller 42 for executing microprograms, a program counter 44 (such as a 9-bit counter), and a microcode memory 46 (such as containing 256 words of 32 bits).

It further comprises additional hardware arithmetic units 48, 50, and 52, designed to carry out operations on numbers that are binary-coded in words of at most 64 bits. Each of these is a dedicated wired integrated circuit whose hardware architecture is designed to always perform the same basic operation. Thus, for example, the hardware arithmetic unit 48 is an addition unit carrying out additions/subtractions or increments/decrements on operands that are binary-coded in words of up to 64 bits. Each of these operations is carried out in a clock cycle. The hardware arithmetic unit 50 is a multiplication unit that carries out, for example, multiplications on operands that are binary-coded in words of up to 32 bits. Each of these multiplications is carried out in a clock cycle. Finally, the hardware arithmetic unit 52 is a logical operation unit that carries out logical operations (shifts to the left or right, parity tests, negations, comparisons, or equality tests) on operands that are binary-coded in words of up to 64 bits. Each of these operations is carried out in a clock cycle.

It further comprises a first set 54 of 64-bit registers intended to temporarily store operands and the intermediary results of calculations commanded by the execution controller 42. This set 54 comprises, for example, two 64-bit operand registers common to all of the additional hardware arithmetic units 48, 50, and 52, an 8-bit operand register specific to the logical operation unit 52 (used to indicate the shift value when this unit performs a shift to the left or right), two 64-bit result registers for addition 48 and multiplication 50 units, and a 128-bit result register for the logical operation unit 52.

It further comprises a second set 56 of n 64-bit registers for storing operands and global results respectively from and to the local memory 40 of the programmable arithmetic coprocessor 18. This second set 56 is, for example, implemented as DPRAM memory with n 64-bit words for storing or reading in Burst mode, n being configurable from 2 to 128.

It further comprises an input command register 58 that is writable by the command scheduler 38, more specifically intended to receive a macro-instruction placed by the command scheduler 38, and an output status register 60 that is writable by the execution controller 42 and readable by the command scheduler 38 to indicate when a macro-instruction was executed.

Finally, the execution controller 42, the microcode memory 46, the additional hardware arithmetic units 48, 50, 52, and the registers 54, 56, 58, 60 are connected to an input/output unit 62 to the local memory 40 of the programmable arithmetic coprocessor 18. This input/output unit 62 carries out read and write cycles for 32- and 64-bit words in simple or Burst mode from sets of registers 54 and 56.

The operation of the specific hardware arithmetic units 30, 32, and 34 will now be detailed.

The hardware unit 30 for the modular addition of large numbers is designed to carry out four types of operations between two large numbers A and B, possibly involving a modular parameter "p", including a simple addition between A and B, a simple subtraction between A and B, a modulo-p addition between A and B, and a modulo-p subtraction between A and B. The choice between a simple operation and a modulo-p operation can be done based on the binary value taken by a "mod" parameter specified by the programmable sequencer 36.

Judiciously, the addition and subtraction operations can be carried out in a pipeline mode, i.e. using a mechanism in which, because the operations on large numbers are done by blocks of 64 bits, the reads, addition/subtraction operations, and stores are carried out on these blocks during each clock cycle. This mechanism increases the speed at which instructions are executed in the programmable sequencer 36. The programmable sequencer starts indeed a new macro-instruction before having finished the previous one. There can therefore be simultaneously multiple executing macro-instructions per 64-bit block. The execution time per macro-instruction is not reduced, but the throughput from the programmable sequencer 36, meaning the number of macro-instructions executed per time unit, increases.

The hardware architecture of the modular addition unit 30 is, for example, designed to carry out the following sequence of instructions when an addition is requested:

Initialization: w=64 bits; k=size(p); s=k/w; A←p; B←p;
For i ranging from 0 to s:
    read A[i], B[i], p[i];
    C1[i]=A[i]+B[i];
    C2[i]=C1[i]−p[i];
    write C1[i];
    write C2[i];
If carry(C2(s))≠0 or mod=0, then C=C1, otherwise C=C2;

In this sequence of instructions that comprises a loop on an index i, the function size( ) returns the size in bits of the word passed as a parameter, and the function carry( ) returns the value of the carry digit in the addition. In practice, carry(C2(s))=0 if C1≥p and carry(C2(s))≠0 if C1<p. In this case, the programmable sequencer 36 gradually provides both possible results C1 and C2 of the addition in parallel, with the correct result selected only at the end of the loop, using the carry test. According to this embodiment, the programmable sequencer 36 therefore gradually provides the local memory 40 with the two results C1, C2, and at the end of the loop, it provides a status bit that indicates which of the two results is correct, based on the requested operation. At the cost of consuming more memory, the addition calculation is judiciously accelerated. The status bit can be stored by the programmable sequencer 36 in the output status register 60 to be read by the command scheduler 38.

The hardware architecture of the modular addition unit 30 is, for example, also designed to carry out the following sequence of instructions when a subtraction is requested:

Initialization: w=64 bits; k=size(p); s=k/w; A←p; B←p;
For i ranging from 0 to s:
    read A[i], B[i], p[i];
    C1[i]=A[i]−B[i];
    C2[i]=C1[i]+p[i];
    write C1[i];
    write C2[i];
If carry(C1(s))≠0 and mod=1, then C=C2, otherwise C=C1;

In this case, the programmable sequencer 36 gradually provides both possible results C1 and C2 of the subtraction in parallel, with the correct result selected only at the end of the loop, using the carry test. According to this embodiment, the programmable sequencer 36 therefore gradually provides the local memory 40 with the two results C1, C2, and at the end of the loop, it provides a status bit that indicates which of the two results is correct, based on the requested operation. At the cost of consuming more memory, the subtraction calculation is judiciously accelerated.

The hardware unit 34 for a modular logic operation on large numbers is designed to carry out two types of operations between two large numbers A and B and two types of operations on one large number A. These are a comparison between A and B that returns a binary parameter whose value is based on the comparison, an equality test between A and B that returns a binary parameter whose value is based on this test and a shift to the right of A bits.

The hardware architecture of the modular logic operation unit 34 is designed, in a manner known "per se", to carry out these four types of logical operations.

The hardware unit 32 for a modular multiplication on large numbers is designed to carry out a modulo-p multiplication by Montgomery reduction between two large numbers A and B. Its hardware architecture is thus designed to carry out the following sequence of instructions, denoted as Montpro(A, B):

Initialization: w=32 bits; k=size(p); s=k/w;
U←0;
For i ranging from 0 to s:
    U←U+A[i]·B;

M←U[0]·N'$_0$;
U←U+M·p;
U←U/2$^w$;
If U≥p, then U=U−p;
C=U;

In this sequence of instructions, the multiplications A[i]·B and M·p are carried out on 32 bits. The result is Montpro(A, B)=A·B·2$^{-k}$ modulo p. In addition, N'$_0$=−1/p[0] modulo 2$^w$ and must be calculated in advance by a microprogram whenever there is a change to the parameter p. This calculation N'$_0$ is known and will not be detailed.

Also judiciously, the multiplication operation by Montgomery reduction can be carried out in a pipeline mode. In this case, the programmable sequencer 36 gradually provides two possible results C1 and C2 of the multiplication by Montgomery reduction in parallel, with the correct result selected only at the end of the loop, using a carry test. According to this embodiment, the programmable sequencer 36 therefore gradually provides the local memory 40 with the two results C1, C2, and at the end of the loop, it provides a status bit that indicates which of the two results is correct. At the cost of consuming more memory, the multiplication calculation by Montgomery reduction is also accelerated.

Using the specific hardware arithmetic units 30, 32, and 34 detailed above and the additional hardware arithmetic units 48, 50, 52, other more complicated operations can be carried out by a microprogram. They are executed by the execution controller 42, with the corresponding microprogram instructions being stored in the microcode memory 46.

A modular multiplication of A by B can be calculated by a microprogram, using the hardware unit 32 for modular multiplication on large numbers, by executing the following sequence of instructions:
A←Montpro(A, R2P);
B←Montpro(B, R2P);
C=Montpro(A, B);
C←Montpro(C, 1)

In this sequence of instructions, R2P=2$^{2k}$ modulo p and should be calculated in advance by a microprogram whenever there is a change to the parameter p. This calculation of R2P is known and will not be detailed.

Also note that this sequence of instructions can become, as optimized:
A←Montpro(A, R2P);
C=Montpro(A, B);

In view of the above, some commands sent by the main processor 12 to the arithmetic coprocessor 18 and processed by the programmable sequencer 36, such as any modular multiplication command, may have a field (such as a bit) indicating whether the modular parameter p is maintained from a previous command. Therefore, if the parameter p is maintained, N'$_0$ and R2P do not need to be calculated in advance because these parameters can be maintained in local memory 40. If the parameter p changes, it can be loaded by the programmable sequencer 36 before the other data from the given command for the advance calculation of the parameters N'$_0$ and R2P.

Also, for example, a modular exponentiation calculation can be carried out by a microprogram based on the hardware unit 32 for a modular multiplication on large numbers. There are several possible implementations, which will not be detailed because they are well-known to one skilled in the art.

Also, for example, a modular inverse calculation can be carried out by a microprogram based on the set of specific hardware arithmetic units 30, 32, and 34 for large numbers. Its implementation is also well-known and will not be detailed.

Also, for example, a modular division calculation can be carried out by a microprogram based on the hardware unit 32 for a modular multiplication on large numbers and on the aforementioned modular inverse calculation. Its implementation is also well-known and will not be detailed.

Also, for example, an elliptic curve scalar multiplication calculation can be carried out by a microprogram based on the hardware unit 30 for modular addition on large numbers and the hardware unit 32 for modular multiplication on large numbers. Its possible implementations are also well-known and therefore will not be detailed. They specifically depend on the selection of coordinates used to situate the points on the given elliptic curve. However, the selection of a system of coordinates is governed by performance criteria and by a resistance to SPA/DPA attacks. The advantage of carrying out the scalar multiplication calculation with a microprogram is therefore to be able to change the implementation without affecting the hardware architecture of the cryptographic integrated circuit 10 or its place and route because the change in implementation is done by a simple read of the microcode memory 46.

Figure 3:
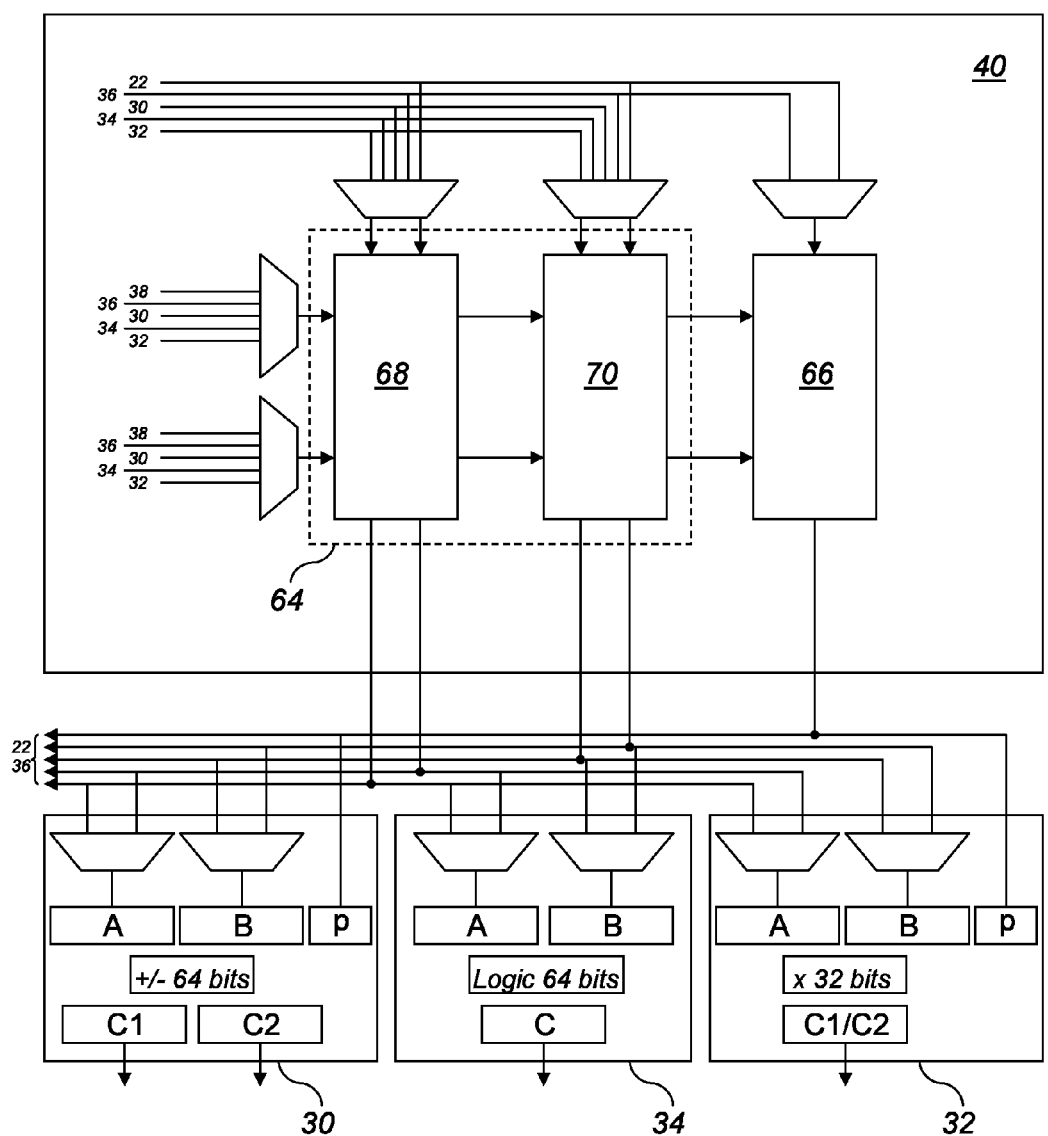

An example of a general structure of the local memory 40 of the arithmetic coprocessor 18 is illustrated schematically in FIG. 3.

The local memory 40, dedicated notably to storing "large number" operands organized into variables and parameters, comprises two main storage modules. A first module 64 is reserved for storing n variables. A second module 66 is reserved for storing parameters, such as elliptic curve or scalar multiplication parameters, the aforementioned parameters N'$^0$ or R2P being involved in the modular multiplication by Montgomery reduction, an exponentiation exponent, the modulo parameter p, etc.

The first module 64 is divided into two mirrored submodules 68 and 70, needed to simultaneously read the variables from the specific hardware arithmetic units 30, 32, and 34. Moreover, because the result provided by such an arithmetic unit can have two possible forms C1 and C2, each submodule 68, 70 it itself divided into two distinct blocks (not shown), which are simultaneously writable. As indicated above, the correct result is selected using the status parameter provided by the arithmetic unit used at the end of the calculation and stored by the programmable sequencer 36 in its output status register 60. To maximize performance, the size of the above mentioned four blocks is 64 bits.

In terms of the total size needed for the local memory 40, the microprogram's execution of a scalar multiplication requires a storage space of about 20 words of up to 521 bits, or up to 20 words of 9×64 bits or 180 words of 64 bits. For the execution of the aforementioned modular multiplication, there must be up to 1 word of 8193 bits for the R2P calculation, or 129 words of 64 bits. This storage space is also needed for the modular reduction, which requires a simultaneous storage of two 4096-bit words each. Storage space for one 4096-bit variable must be added to this, or 64 words of 64 bits, which gives a total of 193 words of 64 bits.

The size of each block is therefore set to a minimum of 256 words of 64 bits, or 2 kB. The first module 64 is therefore sized to 8 kB, for example, for storing two 4096-bit variables or twenty-two 521-bit variables.

For the second module 66, it is necessary to have enough space to store the parameter p, the exponentiation exponent, the aforementioned parameters N'$^0$ or R2P, and the value 1 on 4096 bits used for a conversion between the Montgomery format and the real format in the Montgomery reduction, for a total of four 4096-bit words and one 32-bit word. However, knowing that the parameter N'$^0$ and the value 1 on 4096 bits can successively share the same memory space, it is necessary to provide 4×64 words of 64 bits, or 2 kB for the second module 66.

Accordingly, the local memory 40 is sized at 10 kB.

As illustrated in FIG. 3, the second module 66 and each submodule 68, 70 of the first module 64 is readable and/or writable by the input/output interface 22, the specific hardware arithmetic units 30, 32, and 34, the programmable sequencer 36, and the command scheduler 38. Traditionally, this access is handled using multiplexers.

Specifically:
the input data for the submodules 68 and 70 is provided by the input/output interface 22, the specific hardware arithmetic units 30, 32, and 34, and the programmable sequencer 36,
the input data for the second module 66 is provided by the input/output interface 22 and the programmable sequencer 36,
two independent additional accesses are provided to the second module 66 and to each submodule 68, 70 of the first module 64, towards the command scheduler 38, the programmable sequencer 36, and the specific hardware arithmetic units 30, 32, and 34.

Also as illustrated in FIG. 3, access from each specific hardware arithmetic unit 30, 32, and 34 to the input/output interface 22, the programmable sequencer 36, and the local memory 40 is also done using multiple links managed by multiplexers, the hardware unit for addition of large numbers 30 having to accept two operands A and B and a parameter p for providing two possible results C1 and C2, the hardware unit for multiplication of large numbers 32 having to accept two operands A and B and a parameter p for providing a result C, or two possible results C1 and C2, and the hardware unit for a logical operation on large numbers 34 having to accept two operands A and B for providing a result C.

Clearly, a cryptographic integrated circuit such as that described above can accelerate the operation of its main processor by offloading at least some of its cryptographic calculations, while maintaining the implementation flexibility required for counter-measure and for the development of this circuit at a limited cost.

Also note that the invention is not limited to the embodiment described previously. As is known to those skilled in the art, there are various modifications that can be made to the embodiment described above, with respect to the instruction that has been disclosed. In the following claims, the terms used should not be interpreted as limiting the claims to the embodiments presented in this description, but should be interpreted to include all of the equivalents that the claims intend to cover by their formulation and whose projection is within reach of those skilled in the art by applying their general knowledge to the instruction that has just been disclosed.

The invention claimed is:

1. A cryptographic integrated circuit comprising:
a programmable main processor configured to execute cryptographic functions;
an internal memory;
a data transmission bus to which the main processor and the internal memory are electrically connected; and
a programmable arithmetic coprocessor also electrically connected to the data transmission bus and being separate from the main processor, and comprising
a plurality of specific hardware arithmetic units each configured to perform a predetermined arithmetical operation;
a programmable sequencer that is electrically connected to each of the specific hardware arithmetic units and that includes additional arithmetic units;
an input/output interface that can be connected to the data transmission bus;
a command scheduler that interfaces between the input/output interface and the programmable sequencer; and
a local memory that is electrically connected to the programmable sequencer and to each of the specific hardware arithmetic units,
wherein the hardware architecture of at least one of the plurality of specific hardware arithmetic units is configured to perform modular arithmetical operations in a pipeline mode and to return several possible values from a requested single arithmetical operation, and also a parameter for selecting a single value from among said several possible values.

2. The cryptographic integrated circuit according to claim 1, in which a hardware architecture of each specific hardware arithmetic unit in the arithmetic coprocessor is configured to perform operations on numbers that are binary-coded in words of at least 128 bits, designated as "large numbers".

3. The cryptographic integrated circuit according to claim 1, in which the programmable arithmetic coprocessor comprises at least one hardware arithmetic unit configured to perform modular addition, one hardware arithmetic unit configured to perform modular multiplication using Montgomery reduction, and one hardware arithmetic unit configured to perform a modular logic operation.

4. The cryptographic integrated circuit according to claim 1, in which the programmable arithmetic coprocessor comprises an output status register comprising a storage space of said selection parameter.

5. The cryptographic integrated circuit according to claim 1, in which the hardware architecture of each additional arithmetic unit of the programmable sequencer is configured to perform operations on numbers that are binary-coded in words of at most 64 bits.

6. The cryptographic integrated circuit according to claim 1, in which the programmable sequencer further comprises:
a controller for executing microprograms;
a microcode memory; and
multiple registers including an input command register that is writable by the command scheduler and an output status register that is readable by the command scheduler.

7. The cryptographic integrated circuit according to claim 6, in which the microcode memory comprises program instructions for carrying out at least one of the operations from the set consisting of a modular multiplication, a modular exponentiation, a modular inverse calculation, a modular division, and an elliptic curve scalar multiplication, using the specific hardware arithmetic units and the additional arithmetic units.

8. The cryptographic integrated circuit according to claim 7, in which the programmable main processor and the programmable arithmetic coprocessor communicate according to a programming interface providing at least a portion of a set of arithmetic calculation commands sent to the programmable arithmetic coprocessor by the main processor containing a field to indicate whether the modularity parameter for a modular arithmetical calculation is maintained from a previous calculation.

* * * * *